(12) United States Patent
Murtha (10) Patent No.: US 7,063,625 B2
(45) Date of Patent: *Jun. 20, 2006

(54) PUTTING AID AND METHOD FOR USING SAME

(76) Inventor: James L. Murtha, 4405 Marcourt La., West Des Moines, IA (US) 50265

( * ) Notice: Subject to any disclaimer, the term of this patent is extended or adjusted under 35 U.S.C. 154(b) by 58 days.

This patent is subject to a terminal disclaimer.

(21) Appl. No.: 10/799,458

(22) Filed: Mar. 12, 2004

(65) Prior Publication Data

US 2004/0176176 A1    Sep. 9, 2004

Related U.S. Application Data

(63) Continuation-in-part of application No. 10/055,137, filed on Jan. 23, 2002, now Pat. No. 6,716,109.

(51) Int. Cl.
  *A63B 53/06* (2006.01)
  *A63B 53/16* (2006.01)
  *A63B 69/36* (2006.01)

(52) U.S. Cl. ........................ 473/251; 473/241
(58) Field of Classification Search ............... 473/238, 473/241, 250, 251–254, 407, 409; 33/377–389
  See application file for complete search history.

(56) References Cited

U.S. PATENT DOCUMENTS

| | | |
|---|---|---|
| 2,457,613 A | 12/1948 | Thomas |
| 2,670,209 A | 2/1954 | Fay |
| 3,182,401 A | 5/1965 | Stevens |
| 3,908,281 A | 9/1975 | Fox |
| 3,908,991 A | 9/1975 | Schwartz |
| 4,211,415 A | 7/1980 | Lindo |
| D306,335 S | 2/1990 | Franey |
| 4,934,706 A | 6/1990 | Marshall |
| 5,058,407 A * | 10/1991 | Parker ................. 72/37 |
| 5,160,142 A | 11/1992 | Marshall |
| 5,178,394 A | 1/1993 | Tanampai |
| 5,283,732 A | 2/1994 | Mauritz |
| 5,330,179 A | 7/1994 | Hampel |
| 5,385,349 A | 1/1995 | Marshall |
| 5,431,391 A | 7/1995 | Tracey |
| 5,441,270 A | 8/1995 | Williams |
| 5,492,322 A * | 2/1996 | Smith ................. 473/404 |
| 5,755,623 A | 5/1998 | Mizenko |
| 5,792,015 A | 8/1998 | Hoyt et al. |
| 5,839,970 A | 11/1998 | Lombardo |
| 6,209,371 B1 * | 4/2001 | Guinn ................. 72/31.05 |
| 6,716,109 B1 * | 4/2004 | Murtha ................. 473/241 |
| 6,839,973 B1 * | 1/2005 | Woodward ................. 33/371 |

\* cited by examiner

*Primary Examiner*—Eugene Kim
*Assistant Examiner*—Alvin A. Hunter, Jr.
(74) *Attorney, Agent, or Firm*—McKee, Voorhees & Sease, P.L.

(57) ABSTRACT

A golf putting aid is used with a putter having a handle, a putter head, and an elongated putter shaft. The putting aid includes an elongated member affixed to the putting aid and an attachment member capable of detachably securing the putting aid to the shaft of a putter.

The method comprises attaching the putting aid to the shaft of the putter and using a level on the putting aid to determine the slope of a green between two points on the surface of the green. The putting aid may be used either with, or without the putter.

12 Claims, 12 Drawing Sheets

HUMAN EYE

PUTTING AID AND METHOD FOR USING SAME

CROSS REFERENCE TO OTHER APPLICATIONS

This is a continuation in part of application Ser. No. 10/055,137, filed Jan. 23, 2002 now U.S. Pat. No. 6,716,109.

BACKGROUND OF THE INVENTION

The present invention relates to a putting aid and a method for using same.

In the game of golf, there are three variables with which every golfer must deal during putting. One of these variables is the distance of the ball from the hole. Another is the tendency of the ball to break either to the right or to the left when putted toward the hole. The final variable is the uphill/downhill nature of the putt from the ball to the hole.

Therefore a primary object of the present invention is the provision of an improved putting aid and method for using same.

A further object of the present invention is the provision of a simple and easy to use putting aid which can be carried on the golfer's person and which can be quickly and easily attached to the golfer's putter shaft.

A further object of the present invention is the provision of a putting aid and method for using same which enables the golfer to determine the distance of the putt, the right or left break of the putt, or the uphill/downhill nature of the putt.

A further object of the present invention is the provision of an improved putting aid and method for using same which enables the golfer to use the putter to determine the correct orientation of vertical relative to the hole and to the putt.

A further object of the present invention is the provision of a putting aid and method which permit the hand held use of the device free from attachment to the putter.

A further object of the present invention is the provision of a putting aid and method for using same which are efficient in operation, durable in use, and simple in construction.

BRIEF SUMMARY OF THE INVENTION

The foregoing objects may be achieved by a putting aid for use with a putting hole having opposite margins and/or a golf club having a golf club shaft. The putting aid comprises an elongated body having a longitudinal axis and first and second ends. A level is mounted to the elongated body. The level includes a longitudinal level axis parallel to or coincident with the longitudinal body axis and a bubble indicator for indicating orientation of the longitudinal body with respect to a level orientation. An attachment mechanism is positioned on the elongated body for detachably holding the golf club shaft of the golf club in a position wherein the club shaft is perpendicular to the longitudinal axis of the elongated body. The elongated body and the attachment mechanism are completely removable from the golf club shaft. A plurality of calibrations are located on the elongated body spaced apart from one another a plurality of distances corresponding to the distance from a hole when two of the calibrations are lined up with the opposite margins of the hole.

According to another feature of the present invention the level is located adjacent the first end of the elongated member and the attachment member is a notch located adjacent the second end of the elongated member.

According to another feature of the present invention the notch includes first and second opposite side walls positioned to embrace the golf club shaft therebetween. A first side member and a second side member are mounted to the first and second opposite side walls respectively for compressing or frictionally engaging the golf club shaft therebetween in response to the golf club shaft being fitted within the notch.

According to another feature of the present invention the elongated body includes an elongated calibration portion. The plurality of calibrations are located on the elongated calibration portion.

According to another feature of the present invention the elongated calibration portion includes an elongated calibration portion axis parallel to the longitudinal level axis.

According to another feature of the present invention a viewing opening is positioned between the level and the elongated calibration portion.

According to another feature of the present invention the level is comprised of an elongated transparent tube having a gas bubble therein.

According to another feature of the present invention the attachment mechanism comprises a C-shaped notch in the elongated body, the notch having a pair of spaced apart side walls, an inner notch wall and an open end sized to receive the golf club shaft between the pair of spaced apart side walls.

One method of the present invention comprises lining up the first one of the calibrations with a first one of the margins of the hole. Then a second one of the plurality of calibrations is lined up with the opposite margin of the hole while maintaining the first one of the plurality of calibrations lined up with the first margin of the hole. The distance of the ball from the hole is determined by reading the distance between the first and second calibrations.

According to another feature of the method of the present invention the elongated body includes an elongated calibration portion on which the plurality of calibrations are placed. The step of lining up the first one of the plurality of calibrations comprises lining up one end of the elongated calibration portion with the first one of the margins of the hole.

A further feature of the method of the present invention comprises viewing the hole through an opening in the elongated body.

According to another feature of the method of the present invention the elongated body is held at arms length away from the eye during the two lining up steps and the determining step.

According to another method of the present invention the elongated body is positioned to one side of a line between the first and second points. The elongated body is used to determine the slope between a first point and a second point. One elongated edge of the elongated body is then aligned with both the first point and the second point. The slope of the green is determined from the first point to the second point by observing if the bubble is left of the center indicia, centered with respect to the center indicia or right of the centered indicia.

According to another feature of the method of the present invention the attachment mechanism is a notch in the elongated body. The method comprises placing the shaft of a golf club within the notch so that the shaft of the golf club extends perpendicular to the longitudinal axis of the elongated body. In this manner the shaft of the golf club indicates the slope of the green from the first point to the second point by whether or not the shaft is angled towards the first point from the bottom of the shaft to the top, is angled towards the second point from the bottom of the shaft to the top or is straight up and down between the first and second points.

According to another feature of the method of the present invention first and second side members on opposite sides of the notch are used to frictionally engage the shaft within the notch so as to attach the elongated body to the notch.

According to another method of the present invention the elongated member is positioned to the side of a line extending between a ball on the green and a hole on the green. The steps of lining up the elongated edge of the elongated body with the first and second points respectively comprises lining up the edge of the hole and the ball respectively.

According to another feature of the method of the present invention the first point is an imaginary point on the green and the second point is the golf hole. The elongated body is positioned to one side at a line between an imaginary point on the green and the hole on the green. The elongated edge of the elongated member is lined up with the imaginary point and with the hole on the green so as to determine the slope of the green to the left or right from the imaginary point to the hole.

DETAILED DESCRIPTION OF THE INVENTION

Figure 1:
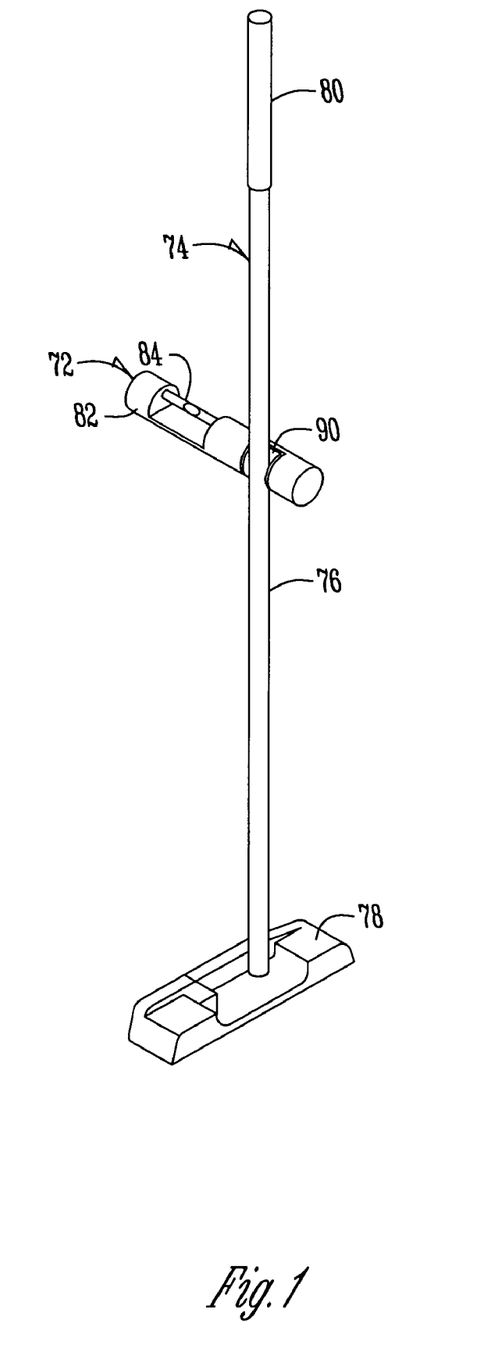
FIG. 1 is a perspective view of a golf club having a first embodiment of the putting aid detachably mounted thereon.

Referring to the drawings the numeral 72 designates one modification of the putting aid of the present invention. The use of this putting aid is shown in FIGS. 1–7A. In FIG. 1 a golf club 74 includes a golf club shaft 76 and a golf club head 78. A golf club grip 80 is mounted on the upper end of the golf club 74.

The putting aid 72 comprises an elongated member 82 having a level 84 therein and a calibration portion 86 (FIG. 2) containing calibrations 88. A shaft notch 90 surrounds the shaft 76 of golf club 74 and includes notched side walls 92, 94 (FIG. 2), an inner end 96 and an open end 98. Notch 90 is C-shaped in configuration. Attached to the side walls 92, 94 are side members 116, 118 which may or may not be made of a compressible material. Side members 116,118 frictionally engage the shaft 76 of the golf club 74 pressed within the notch 90. This attaches the shaft 76 within the notch 90 in a direction that is perpendicular to the longitudinal axis 108 of the elongated member 82.

Figure 2:
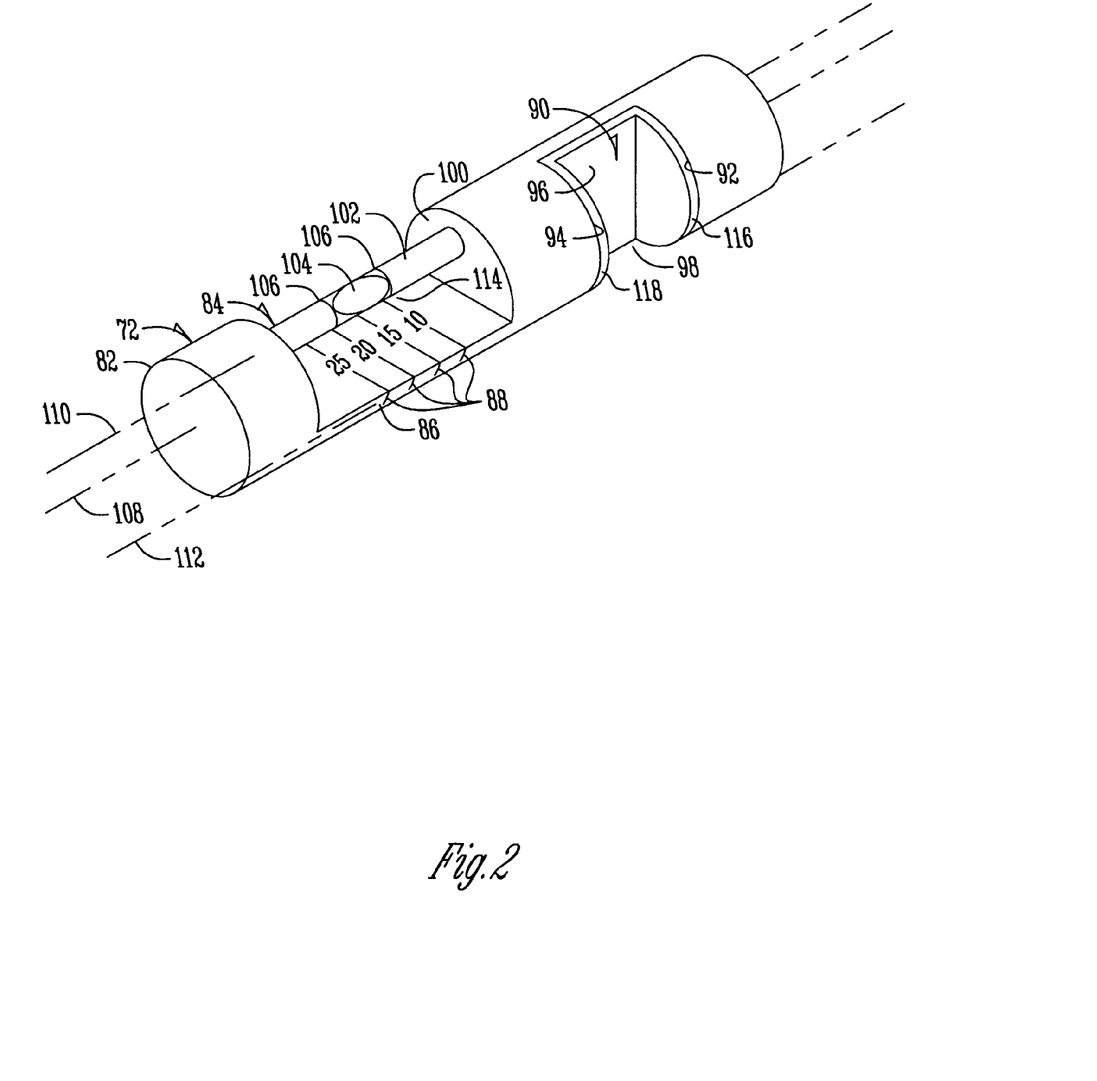
FIG. 2 is a perspective view of the putting aid of FIG. 1.

Adjacent the left end of the elongated member 82 as shown in FIG. 2 is a level cutout 100. A glass tube 102 having a liquid therein and a gas bubble 104 provide the level 84 of the present invention. The level 84 includes center lines 106 which show when the level 104 is centered. The elongated level 84 includes a level axis 110 which is parallel to the elongated axis 108 of the elongated body.

A window or opening 114 is positioned between the elongated tube 102 of level 84 and the calibration portion 86. It should be noted that the level axis 110, the elongated body 108, and the calibration portion axis 112 all are parallel to one another. They may also be coincident with one another.

Figure 3:
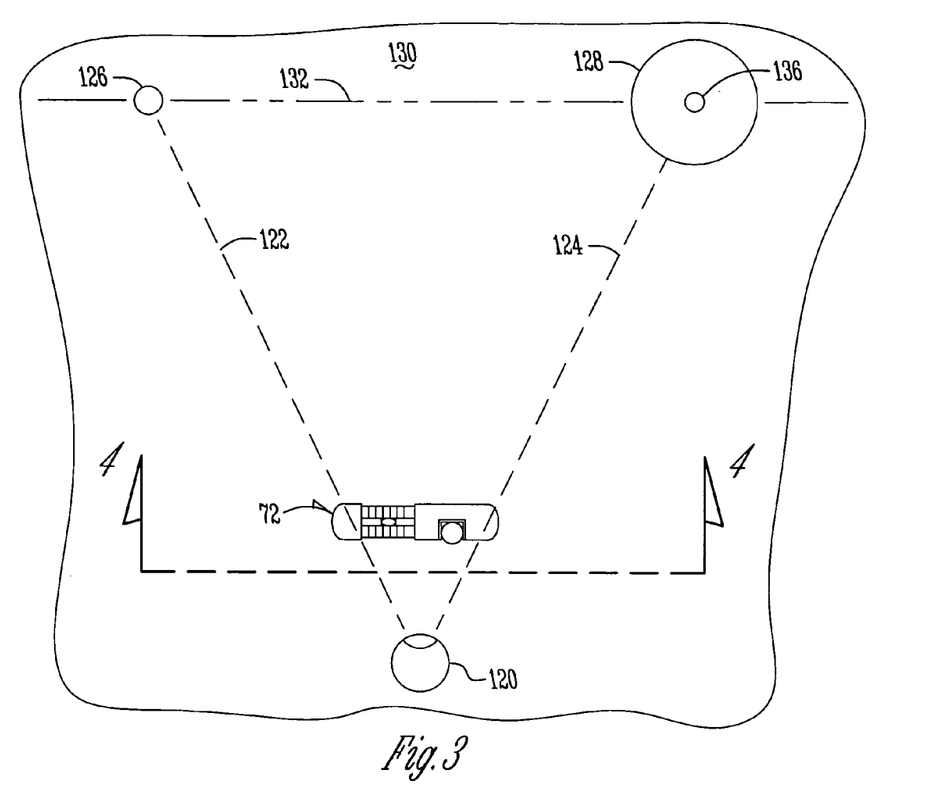
FIG. 3 is a top plan view of the putting aid, the ball, and the hole.
Figure 4:
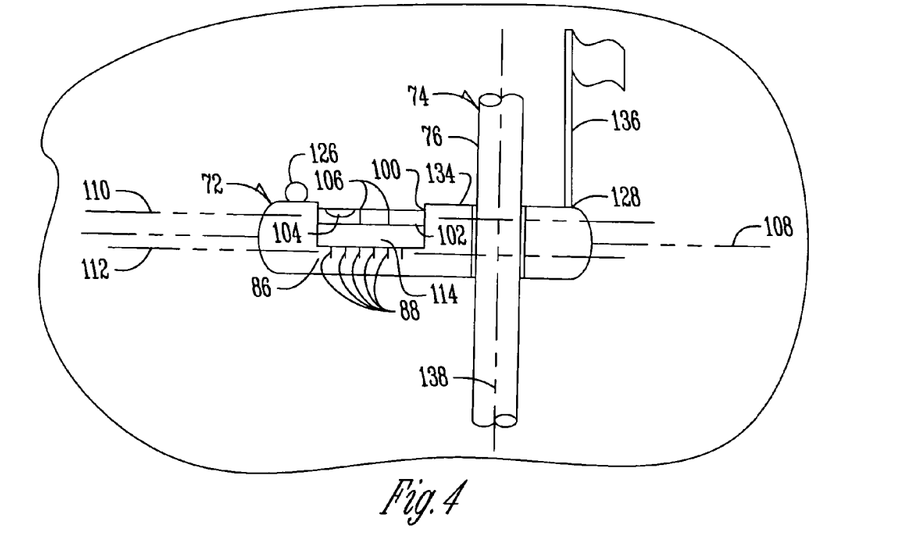
FIG. 4 is a sectional view taken along line 4—4 of FIG. 3.

Referring to FIG. 3, a human eye 120 is shown positioned one side of a line 132 between a ball 126 and a hole 128. The operator holds the putting aid 72 at arms length, and lines up the elongated upper edge 134 of the putting aid 72 with the bottom of the ball 126 and with the bottom edge of the hole 128 as shown in FIG. 4. The lines 122, 124 represent lines from the eye of the observer across the edge 134 of the putting aid 72 to the ball 126 and the hole 128 respectively. A flag 136 is shown within the hole 128.

Once the lining up has occurred as described above, the observer notes the location of the bubble 104 in the tube 102. If the bubble 104 is between the center lines 106 and the ball 126, then the putt is a downhill putt from the ball 126 to the hole 128. This is the condition shown in FIG. 4. If the bubble 104 is centered within markings 106, then the putt is level. If the bubble is between the lines 106 and the hole 128, then the putt is uphill.

The determination of the uphill/downhill putt can also be determined by the orientation of the putter shaft 76. If the putter shaft is inclined along axis 138 so that the upper end of the shaft 76 points towards the hole, then the putt is a downhill putt. Similarly if the axis 138 is vertical, then the putt is level. If the axis 138 is inclined to the left with the upper end pointing to the left then the putt is uphill.

Either the use of the putter shaft 76 or the use of the bubble 104 can be determinative of whether or not the putt is an uphill putt or a downhill putt.

Figure 5:
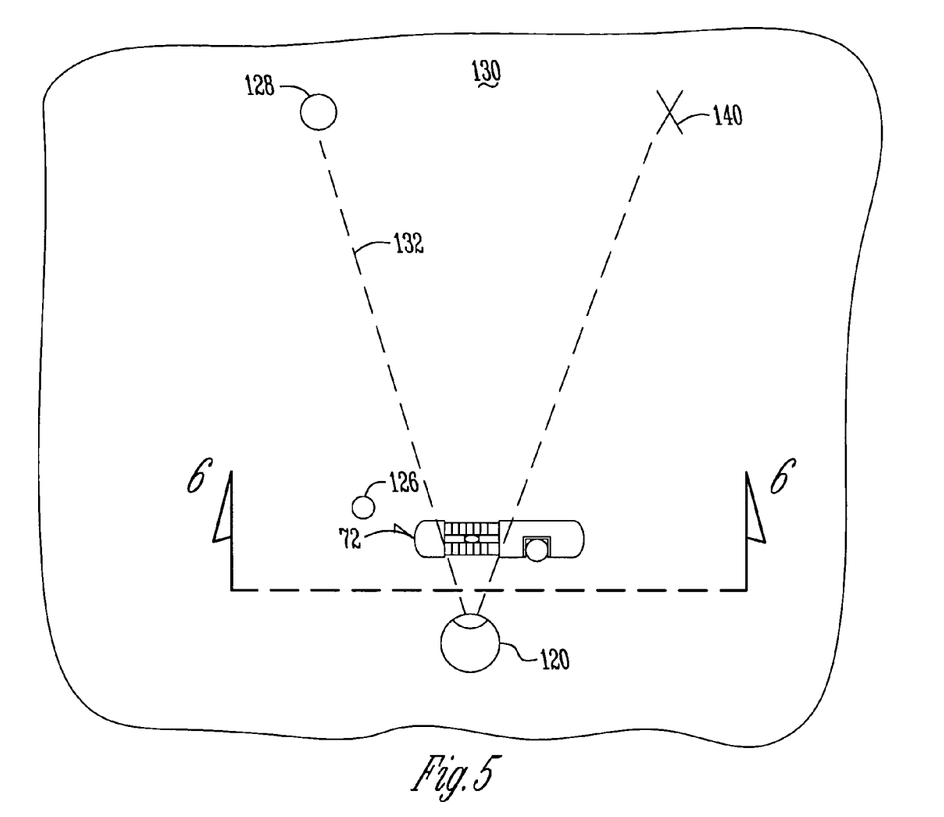
FIG. 5 is a top plan view of the putting aid taking a reading of the slope of the green between an imaginary point and the golf hole.
Figure 6:
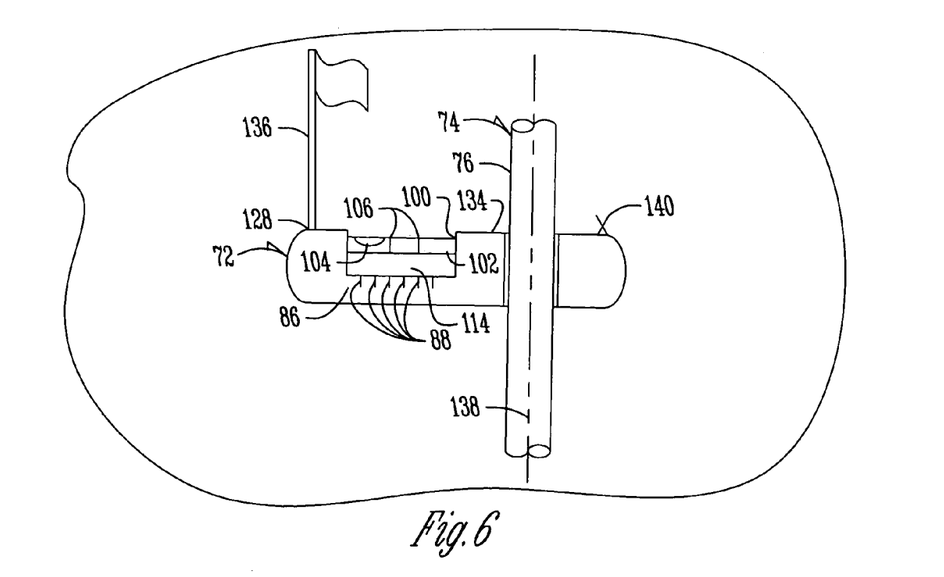
FIG. 6 is a sectional view taken along line 6—6 of FIG. 5.

FIGS. 5 and 6 show the use of the putting aid 72 to determine whether or not the ball will break right or left as it approaches the hole. First the putting aid 72 is positioned to one side of a line between the hole 128 and an imaginary point 140. The putting aid 72 should be approximately equidistant between the hole 128 and the point 140. The upper edge 134 of the putting aid 72 is aligned with the hole 128 and the imaginary point 140. The ball 126 is shown to the left of the putting aid 72. As shown in FIG. 6, the bubble 104 is located between the hole 128 and the center lines 106, thereby indicating that the ball will break left to right as it approaches the hole 128. If the bubble 104 were aligned within the center lines 106 that would be an indication that the putt is straight. Similarly if the bubble 104 is located between the center lines 106 and the imaginary point 140, then the putt will break right to left.

The putter shaft 176 can also be utilized to determine the direction that the putt will break. If the axis 138 points to the right at its upper end then the putt will break from left to right. If the shaft is vertical the putt will be straight. If the upper end of the shaft points to the left, then the putt will break from right to left.

Figure 7:
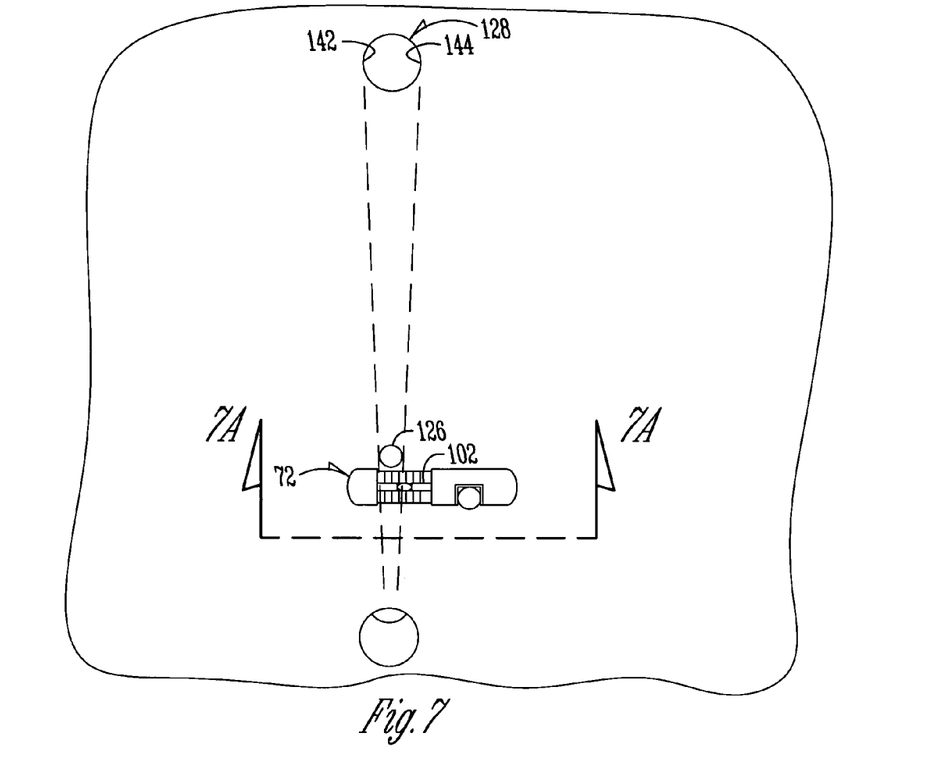
FIG. 7 is a top plan view of the use of the putting aid to determine the distance of the ball from the hole.
Figure 7A:
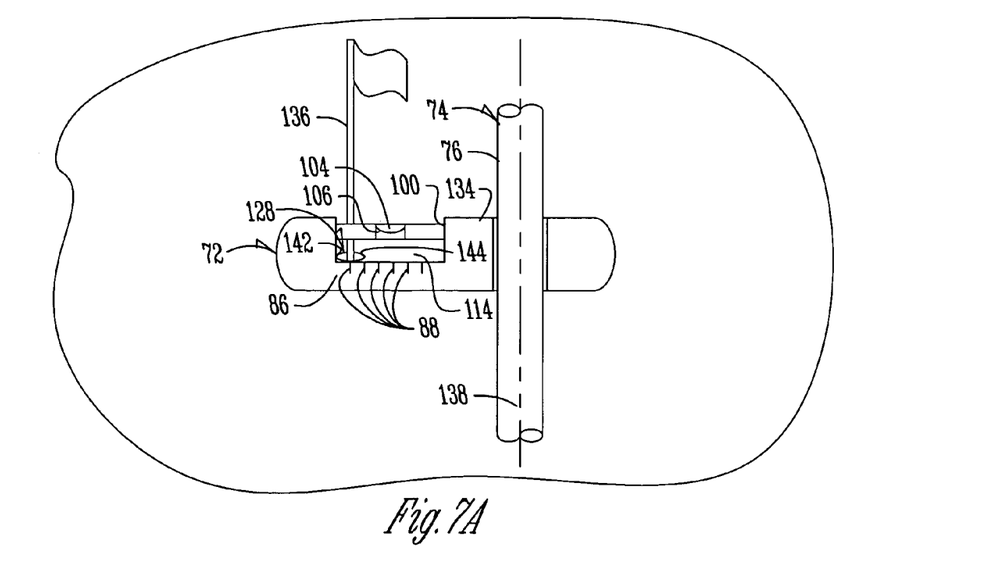
FIG. 7A is a sectional view taken along line 7A—7A of FIG. 7.

FIGS. 7 and 7A show the use of the putting aid 72 to determine the distance of the ball from the hole. As can be seen in FIG. 7, the eye of the observer 120 is lined up so that the left margin 142 of hole 128 is lined up with the left edge of the cut out portion 100. The right margin 144 is lined up with one of the indicia 88, and the distance between the left margin of the cut out 100 and the indicia 88 at the outer margin 142 of the hole indicate the distance of the putting aid 72 from the hole. The putting aid is aligned over the ball 126.

The putting aid 72 of the present invention can be carried in ones pocket and quickly and easily used to determine the uphill downhill nature of the putt, the left to right break of the putt from the ball to the cup, and the distance of the ball from the cup. This device is simple to use and utilizes a minimum of time in determining the three variables of the putt.

Figure 8:
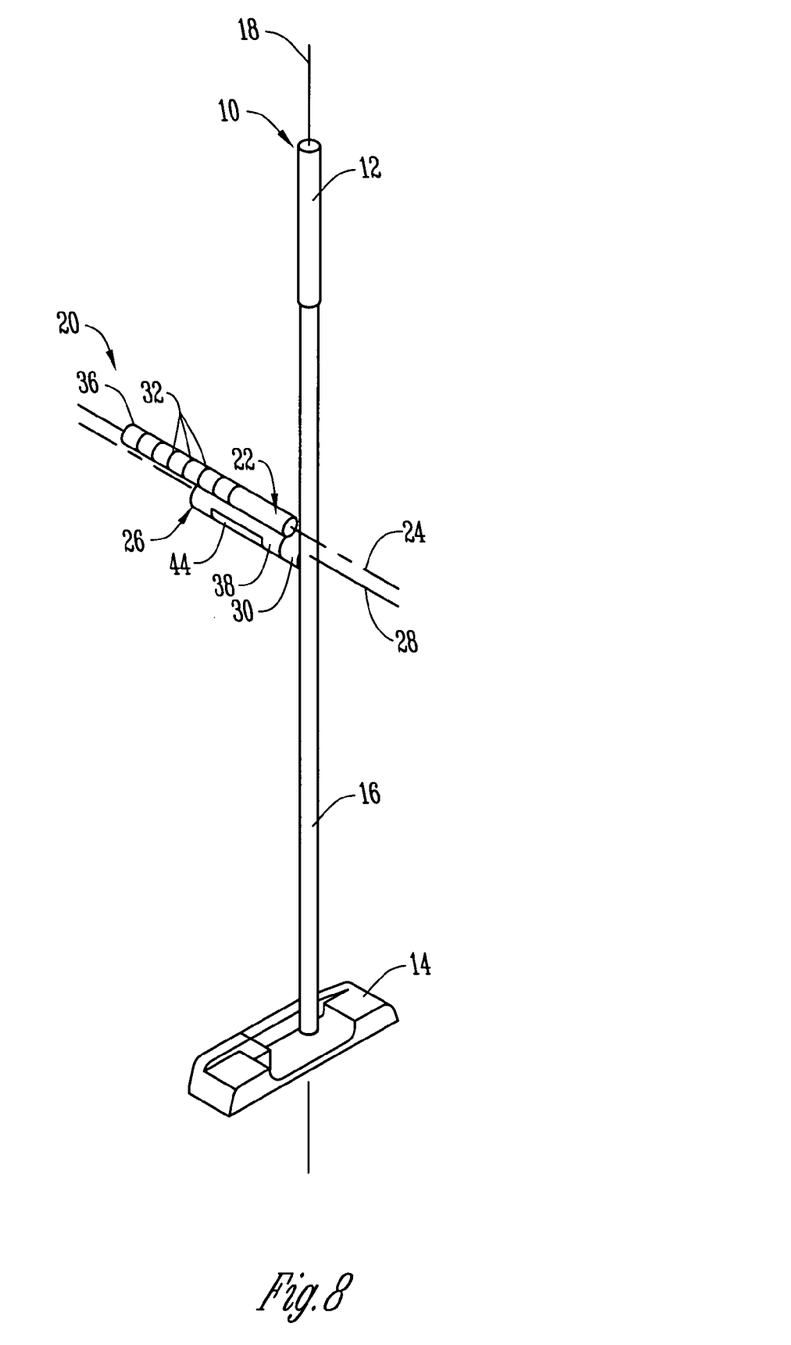
FIG. 8 is a perspective view of a putter having another embodiment of the putter aid attached thereto.

Referring to FIG. 8, a putter 10 is shown having a putter grip 12 and a putter head 14 joined by an elongated putter shaft 16. The numeral 18 designates the longitudinal axis of the putter shaft 16.

Attached to the putter shaft is a putting aid 20 having an elongated member 22. The numeral 24 designates the longitudinal axis of member 22. Member 22 is affixed by glue or other means to a level 26 having a longitudinal level axis 28. The level axis 28 and the member axis 24 are parallel to one another. Connected to the end of the level 26 is an attachment member 30. Attachment member 30 may be of various constructions without detracting from the invention. The preferred means of attachment is the use of a magnet such as the magnet 30 shown in the drawings.

The elongated member 22 includes a plurality of calibrations or indicia spaced apart along its axis 24 and terminates at an inner end 34. Member 22 also has an outer end 36.

Figure 9:
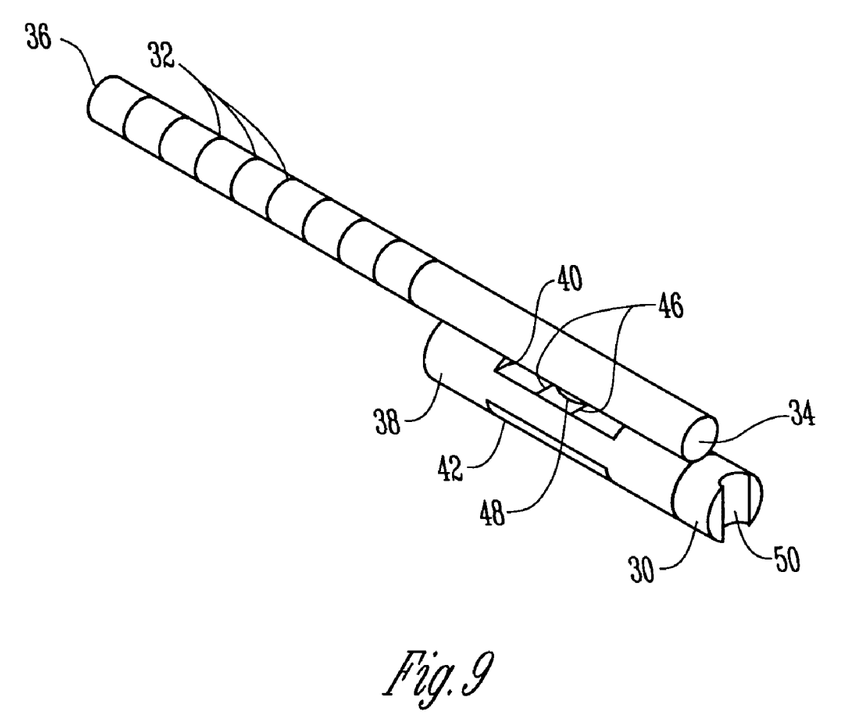
FIG. 9 is a perspective enlarged view of the putting aid of FIG. 8.
Figure 12:
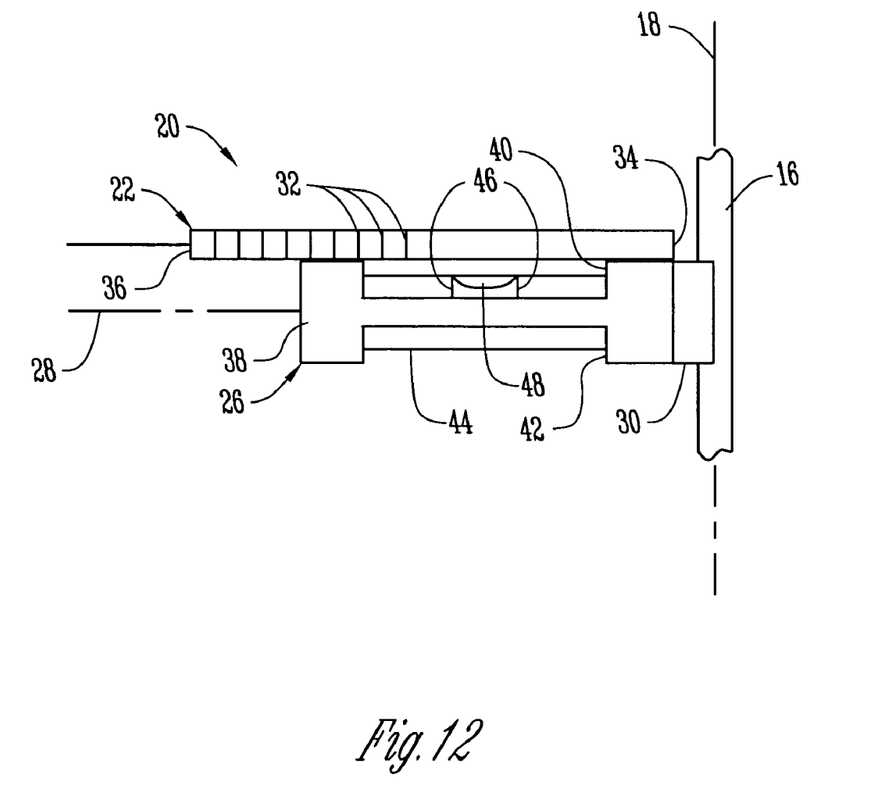
FIG. 12 is an enlarged detail elevational view of the putting aid attached to the shaft of the putter taken along line 12—12 of FIG. 11.

Level 26 includes a level frame 38 having an upper viewing window 40 (FIGS. 9, 10, and 12) and a lower viewing window 42. Within the level frame 38 is an elongated glass tube 44 having spaced apart level marks 46 thereon and having a liquid containing a bubble 48. The bubble 48, when it is centered within the level marks 46 indicates that the longitudinal axes 24, 28 are horizontal and level.

Magnet 30 includes a concave end 50 as can be seen in FIGS. 2 and 3 which enables the magnet to embrace the outer curvature of the putter shaft 16 for detachably affixing the putting aid 20 to the putter shaft 16 as shown in FIG. 8.

Figure 10:
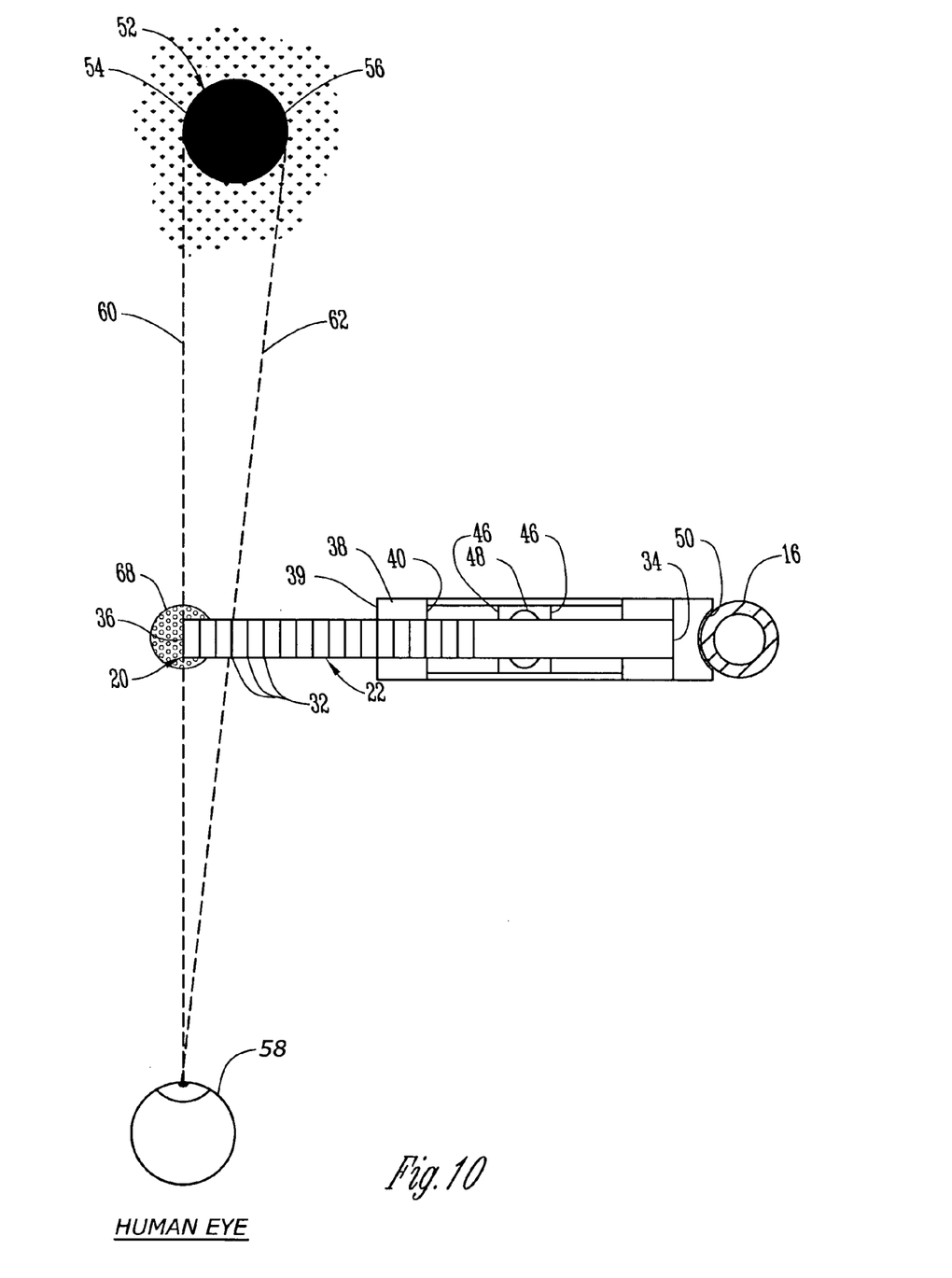
FIG. 10 is a top plan view showing the use of the putting aid to determine the distance of the hole from the ball.

Referring to FIG. 10, the device is shown for determining the distance of the hole from the ball. The putting aid 20 is attached to the putter shaft 16 and the putter shaft 16 is held at arms length. The outer end 36 of the elongated member 22 is aligned with the left margin 54 of the putting hole 52 as shown in FIG. 3. The human eye 58 is used to make this alignment along line 60. Then the human eye aligns the right-hand margin 56 of hole 52 with one of the indicia 32 on the elongated member 36. Depending upon which indicia crosses this line 62, the golfer can determine the distance of the hole 52 from the ball. In making this measurement, the shaft 16 is positioned in vertical alignment above a ball 68.

Thus the indicia on the elongated member 20 tells the golfer the distance of the hole from the ball. Alternatively the right edge 56 of the hole 52 may be aligned with the left end 39 of the level 38 and the line 60 will then intersect one of the indicia 32 to the left of left end 39 so as to indicate distance.

Figure 11:
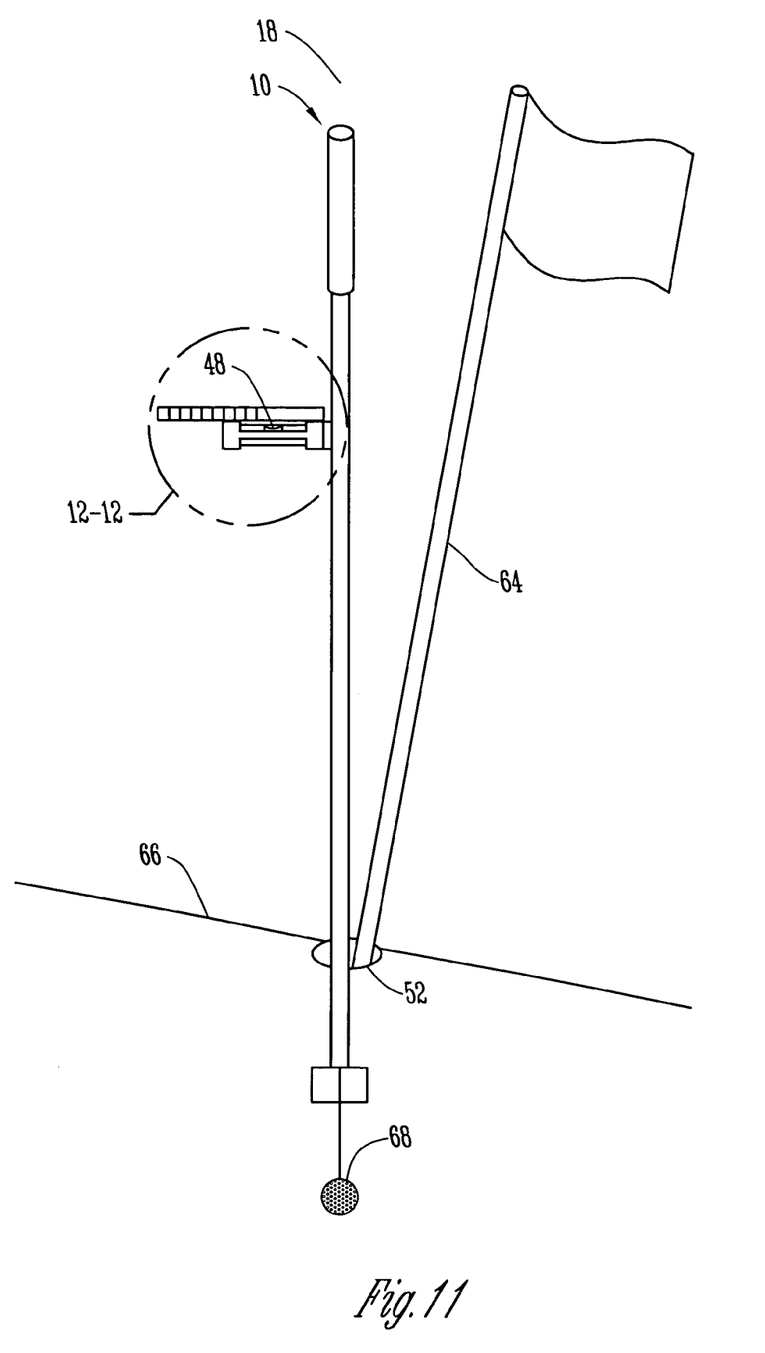
FIG. 11 is an elevational view showing the use of the putting aid to determine whether or not the putt will break left to right or right to left.

FIG. 11 illustrates the use of the putting aid to make the putter 10 into a plumb bob for determining the direction in which the ball will break as it approaches the hole. The level bubble 48 is positioned so that the level is horizontal and this results in the vertical axis 18 of the putter 10 being precisely vertical as in the nature of a plumb bob. The putter is then positioned directly over the ball and in alignment with the center of the hole 52. The horizon 66 adjacent the hole indicates whether the break is to the right or to the left. This can be visually ascertained by comparing the angle of the vertical plumb bob created by the putter 10 and the line of the horizon 66.

The putter can also be used as a plumb bob to determine the uphill or downhill nature of the putt as illustrated in FIG. 6. Again the bubble 48 is positioned centered between the markings on the level and this causes the putter shaft 16 to be vertical. The orientation of the uphill/downhill horizon 70 indicates whether the putt is uphill or downhill. In making this assessment the operator stands at a point between the ball 68 and the hole 52 and to one side of a line between the ball 68 and the hole 52 in order to measure this variable. If the ball 68 is above the hole 52, the putting aid is then held an appropriate distance from the putter's eye 58 so that the inner end 34 of elongated member 22 is aligned with the ball 68 and the outer end 36 of elongated member 22 intersects the flag stick 64. If the hole 52 is above the ball 68, then the outer end 36 is placed on the hole and the inner end 32 is positioned above the ball 68. In either case the slope can be determined by estimating the number of ball thicknesses the elongated member 22 is above the hole or ball respectively.

The horizontal member 22 can also be horizontally aligned with any point on the horizon between the ball 68 and the hole 52 in order to determine the slope at that point. In FIG. 6 the putting aid 20 is shown attached to the putter shaft 16, but it also may be hand held and disattached from the putter shaft 16.

Figure 13:
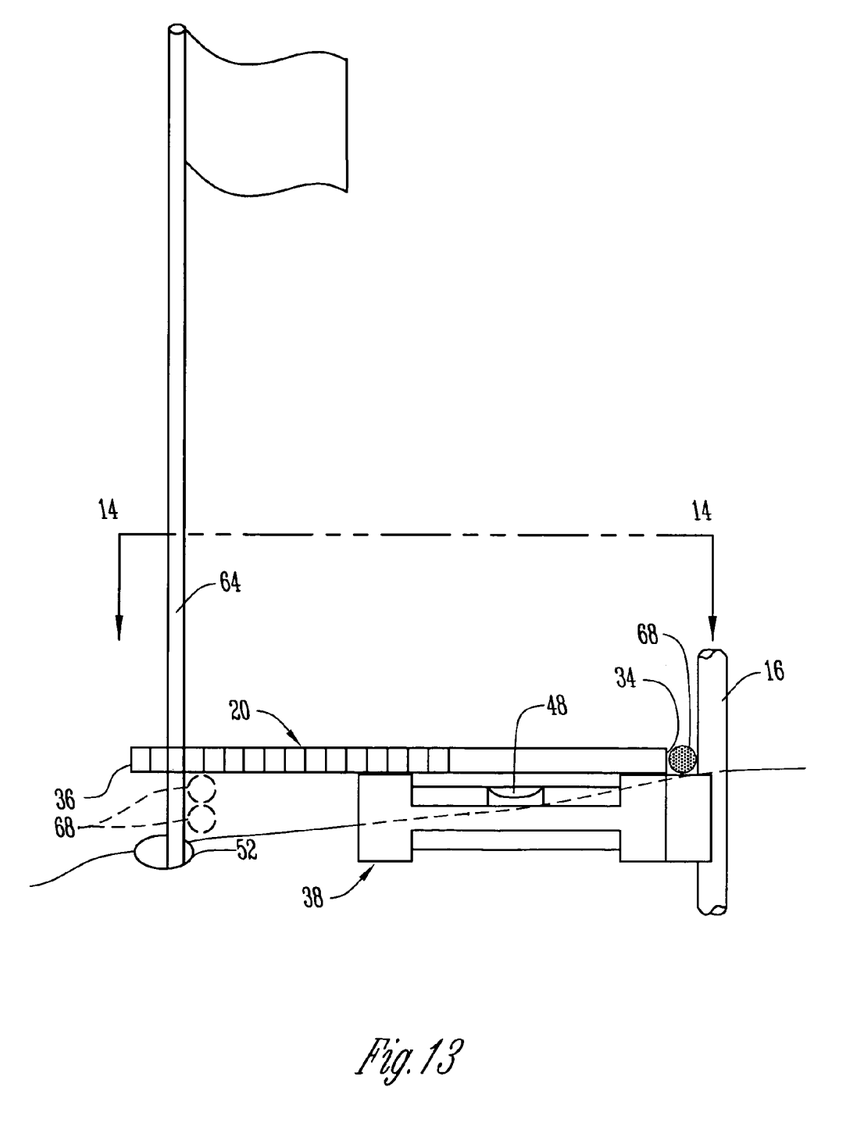
FIG. 13 is an elevational view showing the use of the putting aid in alignment with the ball in order to determine the uphill/downhill nature of the putt.
Figure 14:
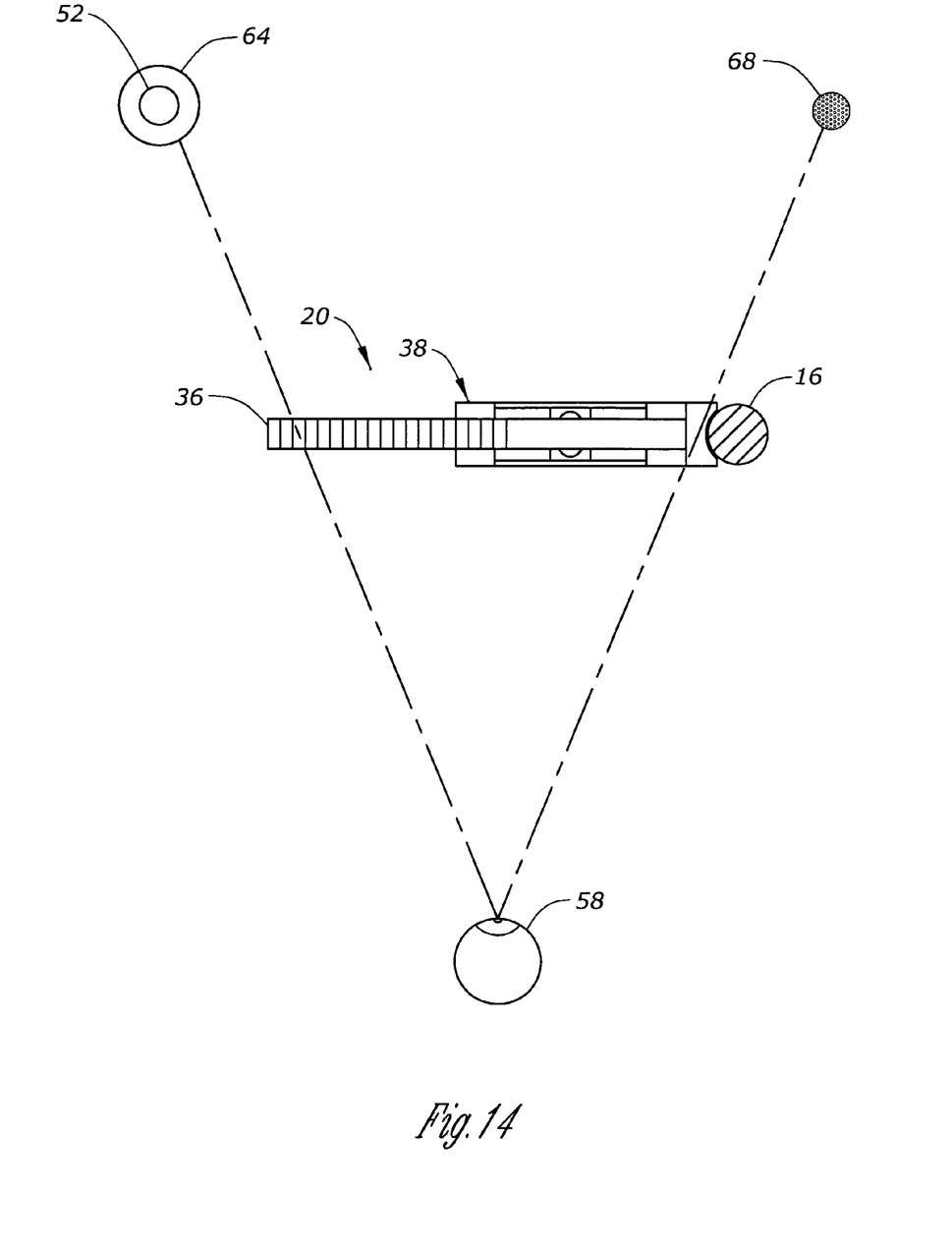
FIG. 14 is a schematic view taken along line 14—14 of FIG. 13.

The device is simple and easy to use. It can be carried in a golfer's pocket and can be attached to the shaft of the putter quickly and easily at the time of putting. It enables the golfer to examine the three variables shown in FIGS. 10, 11, and 13 and described above. The putting aid permits the putter shaft to be used as a plumb bob in a much more accurate fashion then is normally achieved.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A putting aid for use with a putting hole having opposite margins and a golf club having a golf club shaft, the putting aid comprising:
   an elongated body having a longitudinal axis and a first end and a second end;
   a level mounted to the elongated body, the level having a longitudinal level axis parallel to, or coincident with, the longitudinal body axis and a bubble indicator for indicating orientation of the longitudinal body and level axes with respect to a level orientation;

an attachment mechanism positioned on the elongated body for detachably holding the golf club shaft of the golf club in a position wherein the club shaft is perpendicular to the longitudinal axis of the elongated body, the golf club shaft being completely removable from the attachment mechanism;

a plurality of calibrations on the elongated body, the plurality of calibrations being spaced apart from one another a plurality of predetermined distances corresponding to the distance from a hole when two of the calibrations are lined up with the opposite margins of the hole;

the attachment mechanism comprising a notch in the elongated member, the notch including first and second opposite side walls positioned to embrace the golf club shaft there between in a direction that is perpendicular to the longitudinal axis of the elongated member, a first compressible member and a second compressible member being mounted to the first and second opposite side walls respectively for compressing and frictionally engaging the golf club shaft there between in response to the golf club shaft being fitted within the notch;

the elongated body including an elongated calibration portion having a calibration portion axis parallel to the longitudinal level axis, the plurality of calibrations being located on the elongated calibration portion;

the viewing opening being between the level and the elongated calibration portion.

2. The putting aid according to claim 1 wherein the level is comprised of an elongated transparent tube having a gas bubble therein.

3. The putting aid according to claim 1 wherein the attachment mechanism comprises a C-shaped notch in the elongated body, the notch having a pair of spaced apart side walls, an inner notch wall and an open end sized to receive the golf club shaft between the pair of spaced apart side walls.

4. A method for using a putting aid to determine the distance of a golf hole from a golf ball, both of which are spaced apart on the surface of a green, the golf hole having first and second oppositely positioned margins, the putting aid comprising an elongated body having a longitudinal axis and a first end and a second end, a level mounted to the elongated body for determining when the longitudinal axis of the elongated body is horizontal, an attachment mechanism in the elongated body sized to receive a shaft of a golf club and positioned to hold the golf club shaft perpendicular to the longitudinal axis of the elongated body, and a plurality of calibrations on the elongated body, the plurality of calibrations being spaced apart from one another a plurality of predetermined distances corresponding to the distance from a hole when two of the calibrations are lined up with the first and second opposite margins of the hole; the method comprising:

lining up a first one of the plurality of calibrations with a first one of the margins of the hole;

lining up a second one of the plurality of calibrations with the opposite margin of the hole while maintaining the first one of the plurality of calibrations lined up with the first margin of the hole;

determining the distance of the ball from the hole by reading the distance between the first and second calibrations.

5. The method according to claim 4 wherein the elongated body includes an elongated calibrated portion on which the plurality of calibrations are placed, the step of lining up the first one of the plurality of calibrations comprising lining up one end of the elongated calibration portion with the first one of the margins of the hole.

6. The method according to claim 5 wherein the elongated body includes an opening adjacent the elongated calibration portion, the method further comprising viewing the hole through the opening in the elongated body.

7. The method according to claim 4 and further comprising, holding the elongated body at arm's length away from the eye during the two lining up steps and the determining step.

8. A method for using a putting aid to determined the slope of the green surface between a first point and a second point on the surface of the green, the putting aid comprising an elongated body having a longitudinal axis and a first end and a second end, a level mounted to the elongated body for determining when the longitudinal axis of the elongated body is horizontal, the level having a bubble therein and a center indicia indicating a level orientation of the elongated member when the bubble is centered with respect to the center indicia, and a plurality of calibrations on the elongated body, the plurality of calibrations being spaced apart from one another a plurality of predetermined distances corresponding to the distance from a hole when two of the calibrations are lined up with the opposite margins of the hole, the method comprising:

positioning the elongated body between the eye of the user and the first and second points whereby the first point is left of the second point;

aligning one edge of the elongated body with both the first point and the second point;

determining the slope of the green from the first point to the second point by observing if the bubble is left of the center indicia, centered with respect to the center indicia or right of the centered indicia.

9. The method according to claim 8 wherein an attachment mechanism comprises a notch in the elongated body, the method further comprising placing the shaft of a golf club within the notch so that the shaft of the golf club extends perpendicular to the longitudinal axis of the elongated body, whereby the shaft of the golf club indicates the slope of the green from the first point to the second point by whether or not the shaft is angled toward the first point from the bottom of the shaft to the top, toward the second point from the bottom of the shaft to the top or straight up and down between the first and second points.

10. The method according to claim 9 and further comprising frictionally engaging the shaft between first and second side members on opposite sides of the notch while placing the shaft within the notch so as to attach the elongated body to the notch.

11. The method according to claim 8 and further comprising positioning the elongated member to the side of a line extending between a ball on the green and a hole on the green, the steps of lining up the edge of the elongated body with the first and second points respectively comprising lining up the edge with the hole and the ball respectively.

12. The method according to claim 8 wherein the step of lining up the edge of the elongated member with the first and second points comprises lining up the edge of the elongated member with a hole on the green and an imaginary point on the green, respectively so as to determine the slope of the green to the left or right of a line between the golf ball and the hole.

* * * * *